Patented June 9, 1925.

1,541,150

UNITED STATES PATENT OFFICE.

RUDOLF KAISER, OF VIENNA, AUSTRIA.

PROCESS OF IMPROVING THE QUALITY OF BUTTER.

No Drawing.   Application filed December 17, 1924. Serial No. 756,558.

*To all whom it may concern:*

Be it known that I, RUDOLF KAISER, a citizen of the Republic of Austria, residing at Vienna, Austria, have invented certain new and useful Improvements in Processes of Improving the Quality of Butter, of which the following is a specification.

This invention relates to a process of improving the quality of butter.

It is already known to decompose inferior or rancid butter in milk and to again churn the cream regenerated in this manner. These methods of regenerating butter however did not produce the desired result, as in this manner it is impossible to produce a really good butter which satisfies the demands asked of a first-class butter.

The present invention has for its object a process which, contrary to the known processes, renders possible not only the manufacture of a really first-class butter from rancid butter, but also a preparation of a practically unlimited durability.

According to the present invention also clarified butter can be transformed into butter, and margarine into a butter-like product.

The characteristic feature of the present process consists in that a warm mixture of butter and milk of about 80° Celsius, after having been passed through a machine for placing the same into a homogeneous condition, is separated into cream and skimmed milk in a separator which rotates with a number of revolutions which is smaller than the ordinary number of revolutions, and subsequently both products of separation are again intimately mixed by means of agitation and finally cooled in a cream maturing device and allowed to rest for some time.

The process according to the present invention is carried out in the following manner:—

Old rancid butter is intimately mixed with a quantity of milk which amounts to about one third more than the quantity of butter to be worked off (for example 500 lbs. of butter and 650 lbs. of milk). Instead of butter also milk-powder may be dissolved in water, which has the advantage, that independently of the prevailing conditions the necessary quantity of skimmed milk can be produced at any time. The mixture produced in this manner is heated to about 82° Celsius and this temperature is maintained for half an hour. Now at a temperature of about 80° Celsius and at a very low pressure the mixture is passed through a machine of known construction for transforming the mixture into a homogeneous condition. This machine is in communication with a separator in which the homogeneous mixture is separated, whereby however the number of revolutions of the separator are smaller than the ordinary number of revolutions.

As an example of the employed number of revolutions may be stated, that in an Alpha-Lavel-separator having an output of 2500 litres per hour and 5600 revolutions per minute, the latter can be reduced to between 3000 and 4000 revolutions per minute. In consequence of the high heating and th comparatively low number of revolutions of the separator it is possible to separate the cream in spite of the earlier process of homogeneity. The separation constitutes an essential feature of the present invention, and is necessary for rendering possible at all the carrying out of a churning process. In case the cream would be allowed to stand without performing the separation, the pure butyrine would rise up and the skimmed milk would be deposited at the bottom. However in consequence of the process of separation a cream is obtained which is not decomposed. The cream obtained by means of the process of separation and the skimmed milk are allowed to be united again and now the product is intimately mixed by agitation. In this way an ordinary cream is obtained, in which t butyrine is fully present. The cream is thoroughly sterilized owing to the heating and separation.

In the separator even the most minute particles of dirt and cheese are separated and furthermore the material is subjected to a good venting action. Owing to this practically complete sterilization of the product, the regained butter can be maintained in a fresh condition for a very long time. Now the practically pure cream, which has already lost the greatest part of its bad taste, is cooled in a cream maturing machine and is allowed to rest for some time, and either a bacterium, similar to the Tourola yeast, which has a very intense aroma, or pure butyric acid is added.

The essential requirement of the bacterium employed in the process is that the same forms pure butyric acid. A bacterium which is very well suited has been formerly gained from Hungarian ewe-cheese and subsequently has been reared as bacilliculture. It has been called "Kaiser 1049" and deposited at the Government laboratory of Kiel (Germany). In the microscopic image the yeast reared on agar is characterized by oval and somewhat stretched cells, generally 3 wide and 5 long with very little granulated contents. The yeast-cells reared on milk are somewhat longer. In the coloured preparation the same are surrounded by a bright zone. A very agreeable ethereal smell is noticeable on all culture-medium (agar, gelatine, lactine-gelatine, lactine-agar, bouillon and milk) which also is a characteristic of fresh butter. The bacterium is added without any other bacilliculture. According to the invention in place of the described yeast a mixture of butyric acid, obtained from pure butter, and butyric ether may be added, whereby the same effect is produced as above set forth. The cream prepared in this or in another manner is left for 16 hours in a cream maturing device and subsequently is churned in known manner.

I claim:—

1. A process of improving the quality of butter by which inferior or rancid butter is decomposed in milk and the cream regenerated thereby is churned again, consisting in passing the butter and milk through a machine for producing a homogeneous mixture of butter and milk, heating the mixture to about 80° Celsius, separating this warm mixture of butter and milk into cream and skimmed milk in a separator rotating with a number of revolutions which is smaller than the ordinary number of revolutions, subsequently intimately mixing again both products of separation by means of agitation, cooling the mixture thus obtained in a cream maturing device, and finally allowing the mixture to rest for some time.

2. A process of improving the quality of butter by which inferior or rancid butter is decomposed in milk and the cream regenerated thereby is churned again, consisting in passing the butter and milk through a machine for producing a homogeneous mixture of butter and milk, heating the mixture to about 80° Celsius, separating this warm mixture of butter and milk into cream and skimmed milk in a separator rotating with a number of revolutions which is smaller than the ordinary number of revolutions, subsequently intimately mixing both products of separation by means of agitation, cooling the mixture thus obtained in a cream maturing device, adding to the milk and butter product a bacilliculture which is similar to the Tourola-yeast and develops a distinctly agreeable ethereal smell, allowing the mixture to rest for some time, and subsequently churning in known manner.

3. A process of improving the quality of butter by which inferior or rancid butter is decomposed in milk and the cream regenerated thereby is churned again, consisting in passing the butter and milk through a machine for producing a homogeneous mixture of butter and milk, heating the mixture to about 80° Celsius, separating this warm mixture of butter and milk into cream and skimmed milk in a separator rotating with a number of revolutions which is smaller than the ordinary number of revolutions, subsequently intimately mixing both products of separation by means of agitation, cooling the mixture thus obtained in a cream-maturing device, adding to the milk and butter product a mixture of butyric acid obtained from pure butter and butyric ether, allowing the mixture to rest for some time, and subsequently churning in known manner.

In testimony whereof I hereunto affix my signature.

RUDOLF KAISER.

Witness:
CARL COUDENHOVE.